United States Patent [19]

Frederick

[11] Patent Number: 5,746,242

[45] Date of Patent: May 5, 1998

[54] GAS RELIEF VALVE PROTECTOR

[76] Inventor: Michael J. Frederick, 3120 Fawn La., Jackson, Mich. 49201

[21] Appl. No.: 863,285

[22] Filed: May 27, 1997

[51] Int. Cl.[6] .................................................. F16T 1/45
[52] U.S. Cl. ................................................ 137/177; 251/151
[58] Field of Search ............................. 251/151; 137/177

[56] References Cited

U.S. PATENT DOCUMENTS

| 2,020,563 | 11/1935 | Moore | 137/177 |
| 4,486,208 | 12/1984 | Stavropoulos | 137/177 X |

FOREIGN PATENT DOCUMENTS

| 848599 | 7/1952 | Germany | 137/177 |

Primary Examiner—Kevin Lee
Attorney, Agent, or Firm—Young & Basile, P.C.

[57] ABSTRACT

A corrosion protector particularly suitable for use with pressurized gas relief valve systems using conduits in which moisture may enter. The valve corrosion protector comprises a spacer located between the bolted flanges of components of the gas exhaust system, and a tubular neck attached to the spacer extends toward the conduit system exit. The neck is of a diameter less than the inner diameter of the associated conduit and flange whereby moisture upon the inner walls of the conduit system is collected between the conduit and the neck, and a bleed passage adjacent the spacer bleeds the moisture from the conduit system preventing such moisture from contacting the valve and causing corrosion.

17 Claims, 2 Drawing Sheets

GAS RELIEF VALVE PROTECTOR

BACKGROUND OF THE INVENTION

1. Field of the Invention

The invention pertains to a trap located within a pressurized gas exhaust system controlled by a valve to prevent moisture entering the conduit system from coming in contact with the valve.

2. Description of the Related Art

Natural gas transport systems, particularly pipeline systems, utilize a plurality of pumping stations and control stations for regulating the pressure within the conduit transport system. Among the control apparatus used are vent conduit systems controlled by valves whereby excessive gas pressure can be vented to the atmosphere.

Usually, the vents for gas pressure relief consist of a relatively large conduit system, of three inches or more in diameter, and the exit of the conduit system usually discharges upwardly to minimize the likelihood of fire or explosions in the event of gas venting.

The upward orientation of the vent outlet or exit will permit rain and condensation and snow to enter the conduit system, and such moisture will travel downwardly through the vent conduit system and encounter the normally closed control valve. As pressure relief valves operate infrequently, the collection of moisture on the valve often results in corrosion which prevents proper valve operation producing a potentially dangerous situation.

In the past, moisture entering the venting system has been prevented by using a cap on the vent outlet. Usually, such a cap is weight or spring operated whereby the cap opens under the influence of gas pressure being vented, and will close upon the vent valve closing and gas flow ceasing. However, such caps have not proven dependable in that the cap may be damaged by the very rapid opening thereof during venting, or the cap may not properly seal as to effectively prevent moisture from entering the vent system.

Accordingly, a great deal of difficulty has been experienced in keeping control valves for gas venting systems free of corrosion and operable over long periods of time, even though infrequently used, and prior to the present invention, no dependable system exists for protecting the venting valves to insure operability.

OBJECTS OF THE INVENTION

It is an object of the invention to provide a valve corrosion protector for pressurized gas venting systems which is of economical construction and dependable in operation.

A further object of the invention is to provide a corrosion protector for gas venting systems utilizing conduit components having bolted flanges wherein the protector can be retrofitted into existing conduit systems utilizing flanges and bolts which maintain the protector in place.

SUMMARY OF THE INVENTION

Venting systems for pressurized natural gas transport pipelines normally consist of relatively large conduit sections interconnected by welds to flanges. Each flange of the interconnected conduits includes a flat surface whereby abutting flange surfaces may directly contact, or a gasket located therebetween, and upon the tightening of the bolts circumferentially spaced about the flanges, the two conduit sections will be mechanically interconnected.

The pressure relief valve controlling the release of gas pressure is located within the conduit vent system and the valve structure also usually includes flanges, which are bolted to the flange of the discharging conduit system. In the practice of the invention, the corrosion protector includes an annular spacer of a flat configuration having openings defined therein corresponding to the bolt opening of the conduit flanges whereby the spacer may be interposed between connected conduit flanges and be mechanically incorporated into the conduit connection.

The spacer includes a central hole, normally circular, and a cylindrical neck is located within the spacer hole in a fluid tight relationship thereto. The neck may be homogeneously formed of the spacer material, or may be welded, brazed or otherwise bonded to the spacer wherein the axis of the neck will be coincident with the axis of the spacer.

The neck length may be substantially equal to the diameter of the neck, but in any event, the neck diameter must be smaller than the inner diameter of the flange whereby the neck will be located within the flange bore and the outer wall of the neck will be in a radially spaced relationship to the flange inner wall. Preferably, the distance separating the outer wall of the neck and the inner flange wall will be large enough to gather the moisture running down the discharge conduit system.

The annular space located between the neck and the adjacent flange inner wall constitutes a trap or cavity in which moisture located within the venting system is received. As the moisture within the venting system will collect upon the inner diameter of the conduit system, either because of condensation or because of rain or snow, the downward movement of the water within the conduit system results in the water being received within the neck/flange trap and further movement of the water toward the venting valve is prevented. In this manner, the valve is protected against moisture received within the vent conduit system significantly reducing the likelihood of valve corrosion.

In order to prevent an excessive accumulation of moisture within the neck/flange trap, a bleed passage communicates with the trap and the atmosphere whereby the liquid within the trap will flow from the trap to the surrounding environment, and prevent liquid accumulation.

Preferably, the bleed passage comprises a radially extending groove or recess formed in the spacer surface closest to the vent conduit system exit. Accordingly, as water is received within the trap, it will flow through the passage through the bolted conduit connection into the atmosphere.

While the preferred version of the bleed constitutes a radially extending groove or passage defined in the spacer, it is to be understood that other types of bleed means are within the scope of the invention. For instance, a spacer gasket might be interposed between the spacer and the flange closest to the conduit system exit having radial passages defined therein wherein sufficient radial spacing of the trap will occur.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
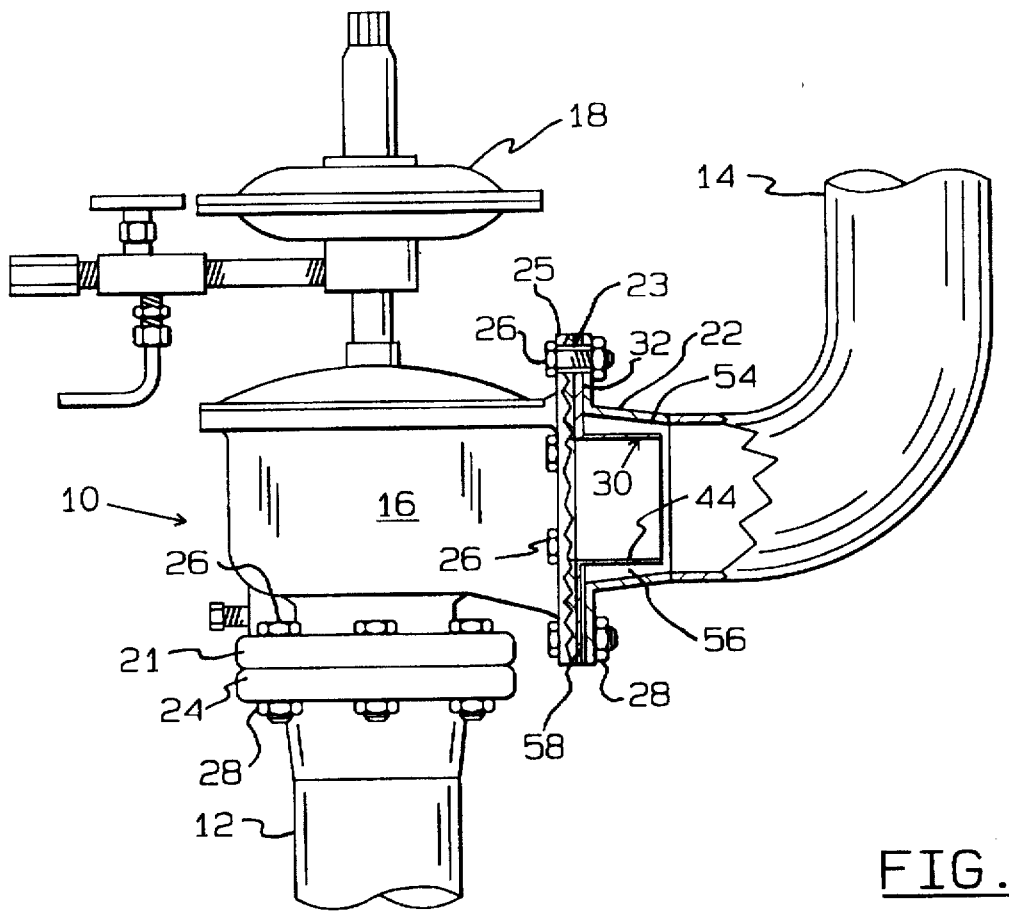
FIG. 1 is an enlarged elevational view of a typical pressurized gas vent system utilizing the concepts of the invention illustrating the invention adjacent a pressure relief valve and installed in a horizontal manner.

A typical pressurized natural gas venting system is shown at 10, FIG. 1, consisting of a lower flanged conduit 12 which will be connected to the gas regulation system, pipeline, or other component of the gas distribution system. The upper conduit 14 constitutes the venting conduit and a pressure relief valve 16 is interconnected between the conduits 12 and 14 having a valve actuator 18 which may be controlled by a control pressure, such as compressed air, or other known actuating system. The valve 16 is incorporated into the lower conduit system 12 by the use of bolted flanges, or the like. The upper conduit 14 terminates in an upwardly extending exit end, not shown, which usually faces upwardly. In some venting systems, a pivotally mounted cover may be mounted on the exit end.

The conduits 12 and 14 are welded to flanges, as are other components in the venting system, and are connected to other flanges by a bolt system. Such flange and bolt systems are common when interconnecting conduits of relatively large diameter, for instance three inches and above. As shown in FIG. 1, the flange 22 is welded upon the upper conduit 14, while the flange 24 is welded upon the upper end of the conduit 12. The flange 21 is a part of the valve structure as in flange 25. Circumferentially spaced bolt holes 23 defined in the flanges permit bolts 26 to extend through the holes having nuts 28 associated therewith. Tightening of the nuts 28 on the bolts 26 will pull the adjacent flanges toward each other to produce the desired sealing.

Figure 3:
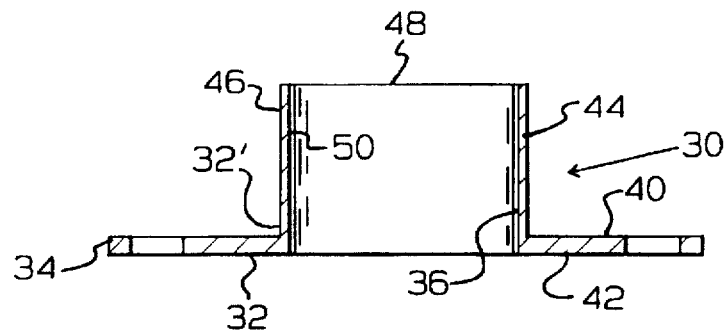
FIG. 3 is a diametrical sectional view of the corrosion protector, per se.
Figure 4:
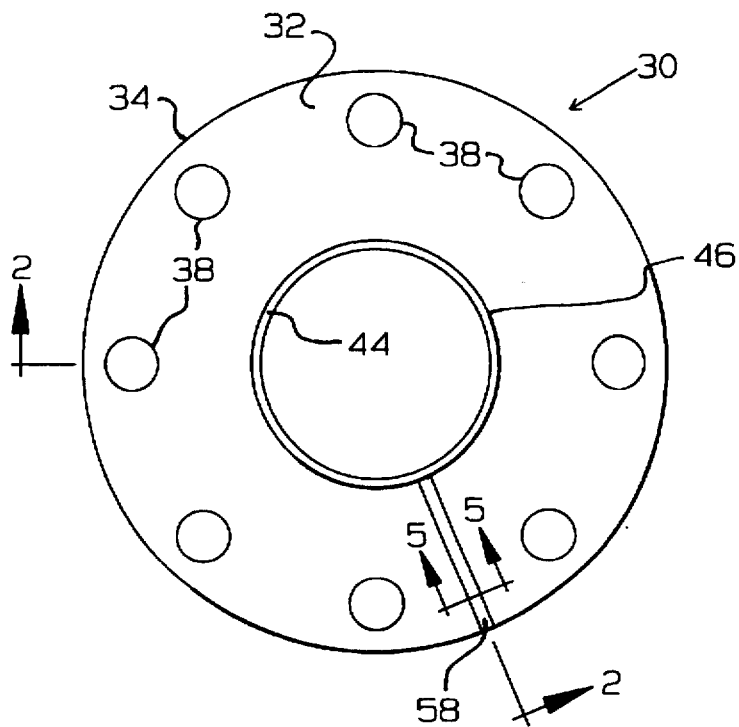
FIG. 4 is a plan elevational view of the corrosion protector as taken from the top of FIG. 4.
Figure 5:
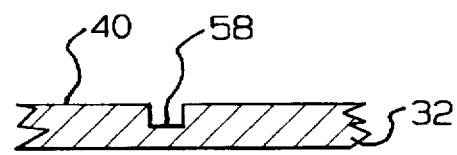
FIG. 5 is an enlarged elevational sectional detailed view taken along Section 5—5 of FIG. 4 through the spacer to illustrate the configuration of the bleed passage.

The corrosion protector constituting the subject matter of the invention is represented at 30, and the corrosion protector includes an annular spacer 32 having a circular circumference 34, FIG. 3. At its center, the spacer 32 is provided with a hole or opening 36, and bolt holes 38 are defined in the spacer 32 circumferentially spaced about the spacer and corresponding to the flange bolt holes 23.

The spacer 32 includes an outer side 40 disposed toward the spacer neck, as later described, and an inner side 42 is disposed toward the valve 16. The sides 40 and 42 are preferably flat and parallel.

The tubular neck 44 extends from the spacer side 40 disposed toward the conduit 14 and its exit end. The neck 44 has an outer diameter 46 and an end 48. The neck bore 50 is similar in diameter to the spacer hole 36, and the neck is affixed to the spacer at 32'.

The corrosion protector 30 may be formed of metal, such as steel, aluminum, brass, bronze, or the like, and it is conceivable that a high strength synthetic plastic could also be used to form the corrosion protector 30. The neck 44 could be cast as an integral part of the spacer 32, or the neck could be welded, brazed, soldered, or otherwise mechanically affixed to the spacer such that the axis of the spacer is substantially coincident with the axis of the neck.

The length of the neck 44 will usually be less than its diameter as indicated at 46. But it is critical to the concept of the invention that the neck outer diameter 46 be less than the inner diameter of the flange that is welded to conduit system conduit 14 into which the neck 44 extends as will be appreciated from FIG. 1. The diameter of the flange 22 is indicated at 54.

Preferably, the outer diameter 46 of the neck 44 will be at least three-eights of an inch less than the inner diameter 54 of the flange 22. This dimensional relationship between the neck and associated flange forms an annular trap 56 about the inner circumference of the flange bore 54 wherein moisture collecting or flowing downwardly on the upper conduit inner diameter will be received within the trap 56 and will not pass into the valve 16. In the concept of the invention, it will be appreciated that the corrosion protector 30 will always be interposed between the relief valve and flange immediately following in the conduit system 10 between the vent exit end and the valve 16.

The spacer outer side 40, i.e. the spacer side disposed toward the conduit system exit end, is provided with a radially extending bleed passage 58 which intersects spacer circumference 34. As the spacer circumference 34 is located adjacent the circumference of the flanges 22 and 25, the passage 58 provides communication between the trap 56 and the atmosphere. Accordingly, liquid received within the trap 56 will flow through the bleed passage 58 to the atmosphere, and in this manner, the trap 56 will not fill and overflow and permit moisture to contact the valve 16. Of course, for the bleed passage to be effective, it must be located at the bottom of the trap 56 when the protector is horizontally disposed as in FIG. 1.

Figure 2:
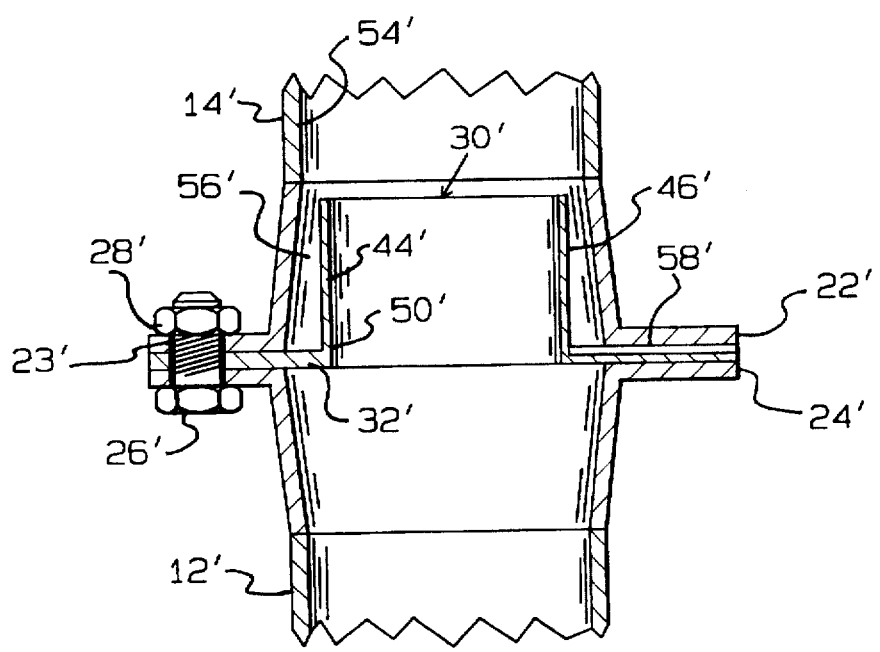
FIG. 2 is a partial detail elevational diametrical sectional view of a conduit system flange interconnection incorporating the corrosion protector of the invention as taken along Section 2—2 of FIG. 4 showing the protector installed in a vertical manner.

In the previously described embodiment, the corrosion protector 30 is interposed between the pressure relief valve 16 flange 25 and the flange 22 welded to the upper vent conduit 14. As the pressure relief flange 25 is horizontally related, the axis of the protector 30 will also be horizontally related, and this type of installation will be the most common. To provide the greatest degree of corrosion protection, the protector 30 should be closely related to the relief valve 16, and as the bleed passage 58 is located at the lowermost portion of the spacer 32 when the protector is horizontally related, moisture within the trap 56 quickly flows downwardly and drips to the ground. In FIG. 2, a variation of installation of the protector is shown and previously described equivalent reference numerals are indicated by primes.

In the embodiment of FIG. 2, the lower conduit 12' is vertically disposed, and this conduit would normally be located directly above a pressure relief valve, not shown, whose discharge is upwardly directed, rather than horizontally orientated as in FIG. 1.

The flange 24' welded upon the lower conduit 12' is bolted to the flange 22' welded to the upper conduit 14'. The upper conduit 14' would usually include a couple right angle bends before terminating in the exit end of the venting system. The corrosion protector 30' is identical to that previously described, and the spacer 32' thereof is located between the conduit flanges 22' and 24'. The bleed passage 58' is now horizontally disposed, and any fluid located within the trap 56' will flow from the trap to the atmosphere through the bleed passage 58'.

Of course, when the corrosion protector 30' is vertically oriented as in FIG. 2, it is necessary that the vent conduit system 14 include at least one right angle bend to prevent rain or snow from directly entering the conduit 14 and falling through the protector bore 50' bypassing the trap 56'.

The corrosion protector 30 of the invention may be readily incorporated into existing conduit venting systems merely by unbolting the bolts 26 and nuts 28, inserting the corrosion protector 30, and reconnecting the bolts and nuts to establish a sealed and mechanical connection between the associated conduits. The protector 30 of the invention has no moving parts, is dependable in operation, and as venting conduit systems normally are of a serpentine configuration, such as shown in FIG. 1, rain and other moisture entering the conduit 14 will quickly deposit upon the inner diameter 54 for entering the trap 56. The practice of the invention will prevent liquid and moisture from entering the valve 16 substantially reducing the likelihood of corrosion and possible inoperability of the valve.

When the pressure relief valve 16 opens to vent gas through the conduit 14, the sudden flow of high pressure gas into the conduit will produce a positive conduit pressure. However, because of the relationship of the neck 44 to the adjacent flange wall 54, a Venturi effect is achieved which reduces the pressure within the chamber 56. Accordingly, the reduced pressure within chamber 56 will cause air to flow into the conduit 14 through the bleed passage 58, and prevent gas from flowing through the bleed passage 58 when the pressure relief valve 16 is open. It would be unsafe for gas to be adjacent the relief valve 16 as a spark might ignite such gas, and the automatic Venturi effect produced by the corrosion protector 30 is an important safety advantage over merely drilling a hole in the lower region of the flange 22, FIG. 1, to permit moisture within the conduit 14 to escape from the vent system. Merely by forming a hole or opening in the lower region of the flange 22 would permit gas to discharge downwardly adjacent the valve 16 and conduit 14, producing a potential fire hazard.

It is appreciated that various modifications to the inventive concepts may be apparent to those skilled in the art without departing from the spirit and scope of the invention.

I claim:

1. A corrosion protector for use with a conduit system having an exit and including components interconnected by bolted flanges wherein annular flanges having flat opposed and aligned surfaces are sealed together by bolts extending through aligned openings defined in the flanges, a flanged component in said conduit system having a wall having an inner diameter of given dimension adjacent its flange, comprising, in combination, an annular spacer having an axis and having parallel flat first and second sides transversely disposed to said axis, axial extending openings defined in said spacer intersecting said sides for receiving flange bolts, a tubular neck extending from said spacer first side having a longitudinal axis substantially parallel to said spacer axis, said neck and said spacer being interconnected in a liquid-tight manner, and bleed means located adjacent said spacer first side, the maximum outer radial dimension of said neck being less than the flanged component wall inner diameter of given dimension whereby said spacer may be interposed between the conduit component system flanges with the said neck received within the conduit component inner diameter of given dimension and whereby the neck and flanged component wall define an annular trap and said bleed means will bleed away liquid located in said trap between said neck and conduit component wall.

2. In a corrosion protector as in claim 1 wherein said neck is cylindrical.

3. In a corrosion protector as in claim 1 wherein said neck is mechanically attached to said spacer.

4. In a corrosion protector as in claim 3 wherein said neck is welded to said spacer.

5. In a corrosion protector as in claim 3 wherein said neck is brazed to said spacer.

6. In a corrosion protector as in claim 1 wherein said spacer and neck are formed of a synthetic material.

7. In a corrosion protector as in claim 6 wherein said spacer and neck are homogeneously formed of the same material.

8. In a corrosion protector as in claim 1 wherein said bleed means comprises a passage located adjacent said spacer first side.

9. In a corrosion protector as in claim 8 wherein said bleed means comprises a radially extending recess defined in said spacer first side.

10. A gas pressure relief valve corrosion protector comprising, in combination, an annular spacer having a circumference, an axis and parallel flat sides transversely disposed to said axis, axial extending bolt receiving openings circumferentially spaced about said spacer intersecting said sides, a tubular neck extending from one of said spacer sides having a longitudinal axis substantially parallel to said spacer axis, said neck and said spacer being interconnected in a liquid-tight manner, and bleed means defined on said one spacer side intersecting said spacer circumference.

11. In a gas pressure relief valve corrosion protector as in claim 10, wherein said neck is cylindrical.

12. In a gas pressure relief valve corrosion protector as in claim 10 wherein said neck is mechanically attached to said spacer.

13. In a gas pressure relief valve corrosion protector as in claim 12 wherein said neck is welded to said spacer.

14. In a gas pressure relief valve corrosion protector as in claim 12 wherein said neck is brazed to said spacer.

15. In a gas pressure relief valve corrosion protector as in claim 10 wherein said spacer and neck are formed of a synthetic material.

16. In a gas pressure relief valve corrosion protector as in claim 15 wherein said spacer and neck are homogeneously formed of the same material.

17. In a gas pressure relief valve corrosion protector as in claim 10 wherein said bleed means comprises a radially extending recess defined is said one spacer side.

* * * * *